United States Patent
Schneider

(10) Patent No.: US 7,974,843 B2
(45) Date of Patent: Jul. 5, 2011

(54) OPERATING METHOD FOR AN AUTOMATED LANGUAGE RECOGNIZER INTENDED FOR THE SPEAKER-INDEPENDENT LANGUAGE RECOGNITION OF WORDS IN DIFFERENT LANGUAGES AND AUTOMATED LANGUAGE RECOGNIZER

(75) Inventor: Tobias Schneider, München (DE)

(73) Assignee: Siemens Aktiengesellschaft, Munich (DE)

( * ) Notice: Subject to any disclaimer, the term of this patent is extended or adjusted under 35 U.S.C. 154(b) by 1198 days.

(21) Appl. No.: 10/501,700

(22) PCT Filed: Jan. 2, 2003

(86) PCT No.: PCT/EP03/00003
§ 371 (c)(1),
(2), (4) Date: Jul. 16, 2004

(87) PCT Pub. No.: WO03/060877
PCT Pub. Date: Jul. 24, 2003

(65) Prior Publication Data
US 2005/0033575 A1    Feb. 10, 2005

(30) Foreign Application Priority Data
Jan. 17, 2002 (EP) .................................. 02001256

(51) Int. Cl.
*G10L 15/04* (2006.01)
(52) U.S. Cl. ......... 704/254; 704/251; 704/252; 704/256
(58) Field of Classification Search .................. 704/246, 704/251, 252, 254, 256
See application file for complete search history.

(56) References Cited

U.S. PATENT DOCUMENTS

| | | | |
|---|---|---|---|
| 5,758,023 A * | 5/1998 | Bordeaux | 704/232 |
| 5,805,771 A | 9/1998 | Muthusamy et al. | |
| 6,085,160 A | 7/2000 | D'Hoore et al. | |
| 6,212,500 B1 | 4/2001 | Kohler | |
| 6,460,017 B1 * | 10/2002 | Bub et al. | 704/256 |
| 7,047,493 B1 * | 5/2006 | Brill et al. | 715/533 |
| 2002/0083029 A1 * | 6/2002 | Chun et al. | 706/45 |
| 2002/0173945 A1 * | 11/2002 | Fabiani et al. | 704/1 |
| 2003/0050779 A1 * | 3/2003 | Riis et al. | 704/236 |

(Continued)

FOREIGN PATENT DOCUMENTS
WO    WO9502879    1/1995

OTHER PUBLICATIONS
Mutusamy et al., "Automatic Segmentation and Identification of Ten Languages Using Telephone Speech", Proceedings of the International Conference on Spoken Language Bd. 2, Oct. 12-16, 1992, pp. 1007-1010.

(Continued)

*Primary Examiner* — Leonard Saint Cyr
(74) *Attorney, Agent, or Firm* — King & Spalding L.L.P.

(57) ABSTRACT

The invention relates to an operating method for an automated language recognizer intended for the speaker-independent language recognition of words from different languages, particularly for recognizing names from different languages. The method is based on a language defined as the mother tongue and has an input phase for establishing a language recognizer vocabulary. Phonetic transcripts are determined for words in various languages in order to obtain phoneme sequences for pronunciation variants. The phonemes of each relevant phoneme set of the mother tongue are then specifically mapped to determine phoneme sequences that correspond to pronunciation variants.

18 Claims, 1 Drawing Sheet

U.S. PATENT DOCUMENTS

2004/0039570 A1* 2/2004 Harengel et al. .............. 704/232
2004/0098259 A1* 5/2004 Niedermair .................. 704/254

OTHER PUBLICATIONS

Valch et al., "HMM Phoneme Recognition with Supervised Training and Viterbi Algorithm", Eighteenth Convention of Electrical and Electronic Engineers in Israel, Mar. 7-8, 1995, pp. 3-2.1/1-5.

Anderson et al., "The Onomastica Interlanguage Pronunciation Lexicon", 4th European Conference on Speech Communication and Technology, Madrid, Spain, Bd. 1 Conf. 4, Sep. 18-21, 1995, pp. 829-832.

* cited by examiner

OPERATING METHOD FOR AN AUTOMATED LANGUAGE RECOGNIZER INTENDED FOR THE SPEAKER-INDEPENDENT LANGUAGE RECOGNITION OF WORDS IN DIFFERENT LANGUAGES AND AUTOMATED LANGUAGE RECOGNIZER

BACKGROUND

The method relates to an operating method of an automatic language recognizer for speaker-independent language recognition of words of different languages and a corresponding automatic language recognizer.

For phoneme-based language recognition, a language-recognition vocabulary is required, containing phonetic descriptions of all the words to be recognized. Typically, words are represented by sequences or chains of phonemes in the vocabulary. During a language recognition process, a search is conducted for the best path through various phoneme sequences found in the vocabulary. This search can, for example, take place by means of the Viterbi algorithms. For continuous language recognition, the probabilities for transitions between words can also be modeled and included in the Viterbi algorithm.

A phonetic transcription for the words to be recognized form the basis of phoneme-based language recognition. Therefore, at the start of a phoneme-based language recognition process, the first order is to obtain phonetic transcripts for the word. Phonetic transcripts can be generally defined as the phonetic descriptions of words from a target vocabulary. Obtaining phonetic transcripts particularly relevant for words that are not known to the language recognizer.

Mobile or cordless telephones are known that enable speaker-dependent name selection. In this case, a user of such a telephone must train the entries contained in the electronic telephone book of the telephone in order to be able to subsequently use the name selection by spoken word. Normally, no other user can use this feature because the speaker-dependent name selection is suitable for only one person, i.e. for the person who has trained the language selection. To overcome this problem, the entries in the electronic telephone book can be changed to phonetic transcripts.

To determine the phonetic transcript from a written word, for example from a telephone book entry, various approaches are known in the art. One example is a dictating system that is used with a PC. With dictating systems of this kind, a lexicon of typically more than 10,000 words with an allocation of letter sequences to the phoneme sequences is normally stored. Because a lexicon of this kind requires a very high storage capacity, it is not practical for mobile terminal devices such as mobile or cordless telephones to wholly incorporate this configuration.

Systems are also known whereby the conversion of a word to its phonetic transcript is rule-based, or takes place using specially trained neural networks. As with the lexicon, this method also has one disadvantage that the language in which the phoneme sequences to be realized must be specified. In any case, names from different languages may be present, particularly in electronic telephone books. On a mobile device, converting words from different languages would be burdensome to wholly implement under the above configuration.

Other multilingual systems for determining phoneme sequences and language recognition have been developed. These systems enable phoneme sequences to be created from different languages.

Under still other configurations, a user speaks the words into a language recognition system that automatically generates sequences of phonemes. However, for large vocabularies, (e.g., an electronic telephone book with 80 entries), this is no longer acceptable for the user.

SUMMARY OF THE INVENTION

The present disclosure provides an operating system and method for an automatic language recognizer for speaker-independent language recognition of words from various languages and also a corresponding automatic language recognizer that is simple to implement, is particularly suitable for use in mobile terminal devices and can be realized at reasonable cost.

As an example, a method for voice recognition is provided including the steps of:

(a) determining the phonetic transcripts of words for N various languages, in order to obtain N first phoneme sequences per word corresponding to N first pronunciation variants;

(b) implementing a mapping of the phonemes of each language to the relevant phoneme set of the mother tongue;

(c) using the mapping implemented in step (b) to the N first phoneme sequences for each word determined in step (a), whereby for each word N second phoneme sequences corresponding to N second pronunciation variants are obtained that can be recognized by means of a mother tongue language recognizer; and (d) creation of a language recognition vocabulary with the N second phoneme sequences per word, obtained in the preceding step, for the mother tongue language recognizer.

As another example, a system for voice recognition is provided including: a mother tongue language recognizer; a first processing module for determining the phonetic transcripts of words for N various languages in each case, in order to obtain N first phoneme sequences for each word corresponding to N first pronunciation variants; a second processing module for implementing a mapping of the phonemes of each language to the particular phoneme set of the mother tongue; a third processing module for applying the mapping, implemented by means of the second processing module, to the N first phoneme sequences for each word determined by means of the first processing module, with N second phoneme sequences corresponding to N second pronunciation variants being obtained per word, that can be recognized by means of the mother tongue language recognizer; and a fourth processing module for creating a language recognizable vocabulary with the N second phoneme sequences per word, obtained by the third processing module, for the mother tongue language recognizer.

BRIEF DESCRIPTION OF THE DRAWINGS

The invention and its wide variety of potential embodiments will be more readily understood through the following detailed description, with reference to the accompanying drawing in which.

DETAILED DESCRIPTION

Figure 1:
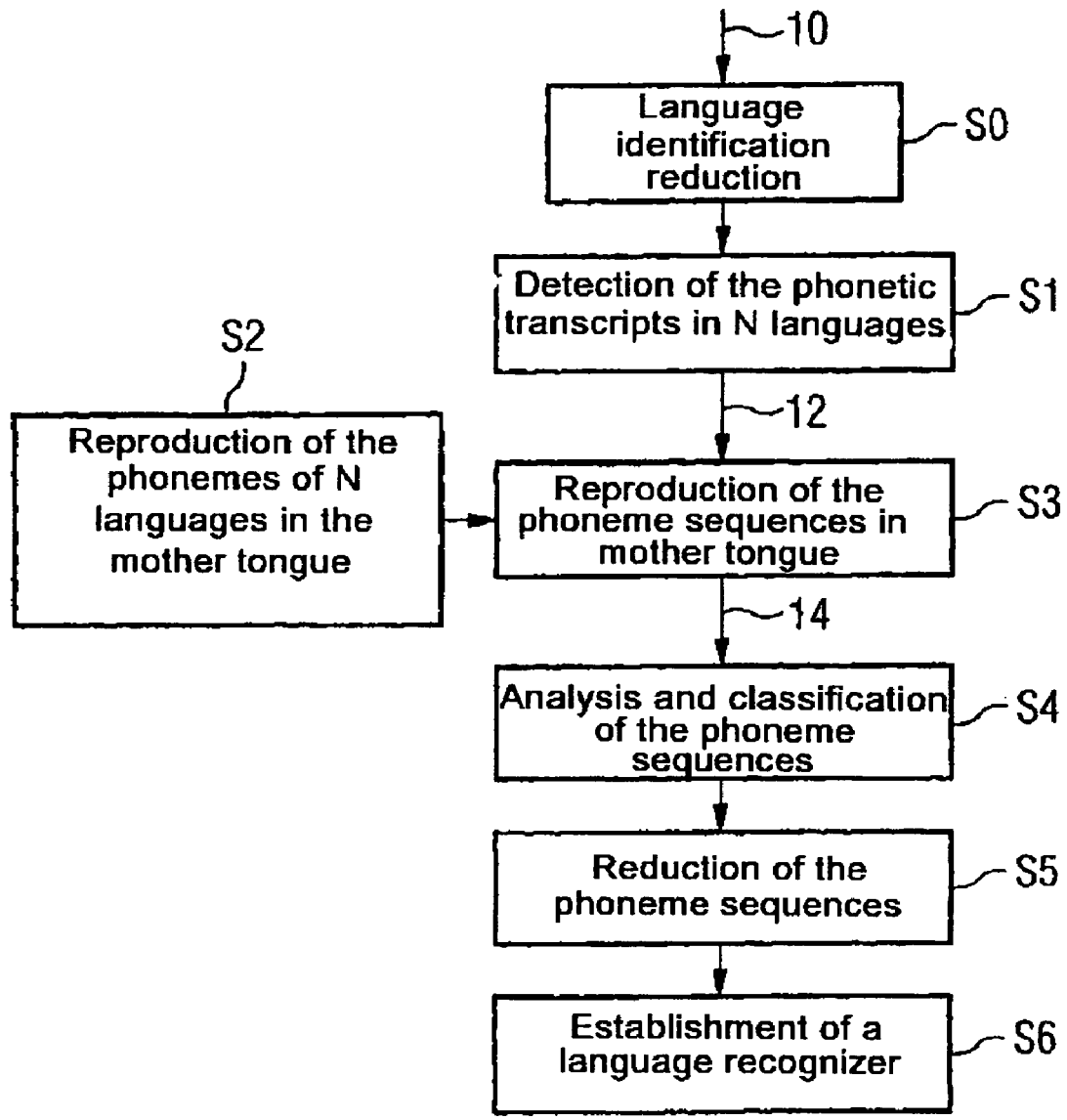
FIG. 1 is a schematic flow diagram of the input phase for creation of a language recognition vocabulary in accordance with an exemplary embodiment of the invention.

Under an exemplary embodiment, phonetic transcripts of words for N various languages is determined and then reprocessed and applied to a phoneme-based monolingual language recognizer. This procedure works under the assumption that a user of the voice recognizer normally speaks in his/her mother tongue. The user may also pronounce foreign-language words, such as names, with a mother-tongue nuance, (i.e. an accent), that can be roughly modeled by a mother-tongue language recognizer. The operating method is therefore based on a language defined as the mother tongue.

Each language can thus be described with different phonemes suitable for the particular language. It is known, however, that many phonemes in different languages resemble one another. An example of this is the "p" in English and German.

This fact is utilized in multilingual language recognition. In this case a single Hidden Markov model is created for the collection of languages, by means of which several languages can be recognized simultaneously. However, this leads to a very large Hidden Markov model with a lower recognition rate than a monolingual Hidden Markov model. Furthermore, if the collection of languages is extended, for example by a secondary language, a new Hidden Markov model has to be created, which is very expensive.

According to an exemplary embodiment, in a first step of the input phase for creation of a language recognition vocabulary of an operating procedure of an automated language recognizer for speaker-independent language recognition of words from various languages, particularly for the recognition of names from various languages, the phonetic transcripts of words for N various languages are determined in each case, in order to obtain N first phoneme sequences per word corresponding to N first pronunciation variants. In a second step, the similarities between the languages are utilized. To do this, a depiction of the phonemes of each language is implemented on the particular phoneme set of the mother tongue. Furthermore, in a third step the implemented depiction on the N first phoneme sequences determined in the first step is used for each word. In this way, N second phoneme sequences corresponding to N second pronunciation variants are obtained for each word. By means of the mother-tongue language recognizer, a number of N various languages can then be recognized for the mother-tongue language recognizer after creating a language-recognition vocabulary using the N second phoneme sequences per word obtained in the preceding step.

Whereas a look-up method in a lexicon configuration fails with mobile terminal devices because of the large memory requirement and for multilingual language recognition the set of languages was optimized, new Hidden Markov models have to be created and optimized for each new language by means of grapheme/phoneme conversion into several languages in accordance with the invention, a multilingual system is created that can be implemented with relatively simple means. In addition to the grapheme-to-phoneme conversion, a mapping, i.e. a depiction between the individual languages, is implemented. The phoneme sequence determination and the succeeding mapping or depiction normally run offline on a device, for example a mobile telephone, a personal digital assistant or personal computer with corresponding software, and are therefore time uncritical. The resources required for this can be held in an internal/external memory.

Because the language recognition vocabulary created by means of the aforementioned procedure includes an N pronunciation variant for each word, the search effort during language recognition can be great. To reduce this, a further step can be introduced under the exemplary embodiment, that is performed before the creation of the language recognition vocabulary and after generation of the N second phoneme sequences per word. In this step, the N second phoneme sequences are processed corresponding to the N second pronunciation variants of each word, in that each second phoneme sequence is analyzed and classified by means of suitable distances, particularly the Levenshtein distance, and the N second phoneme sequences of each word are reduced to a few, preferably two to three phoneme sequences, in that the pronunciation variants that are least similar to the pronunciation variants of the mother tongue are omitted. Simply expressed, the least important pronunciation variants are omitted by this reduction, thus reducing the search effort during language recognition.

A further reduction in cost can be achieved in that a language identification and reduction is carried out before the first step. As part of this language identification, the probability for each word to be recognized belonging to each of the N various languages is determined. Using the results of this language identification, the number of languages to be processed in the first step of the method is reduced, preferably to two or three different languages. The languages with the least probability are not further processed. For a specific word, the result of the language identification can, for example, be as follows: German 55%, UK English 16%, US English 14%, Swedish 3%, etc. Under this example, if only three languages are desired, the Swedish language is omitted, i.e. not further processed.

The determination of the phonetic transcripts in the first step of the method takes place preferably by means of at least one neural network. Neural networks have proved suitable for determining phonetic transcripts from written words, because they produce good results with regards to accuracy, and particularly with regard to the speed of processing and can be easily implemented, particularly in software.

A Hidden Markov model, particularly one that has been created for the language defined as a mother tongue, is suitable for use as a mother tongue language recognizer.

The exemplary embodiment of the invention relates to a language recognizer for speaker-independent language recognition of words from various languages, particularly for recognizing names from various languages. In this case, one of the various languages is defined as the mother tongue. The language recognizer includes:

a mother tongue language recognizer, a first processing model for determining the phonetic transcripts of words, particularly for N various languages, in order to obtain N first phoneme sequences corresponding to N first pronunciation variants per word, a second processing model for implementing a mapping of the phoneme of each language on the particular phoneme set of the mother tongue, a third processing model for applying the mapping, implemented by the second processing module, to N first phoneme sequences for each word, determined with the first processing model, whereby N second phoneme sequences corresponding to N second pronunciation variants are obtained per word, that can be recognized by the mother tongue language recognizer and a fourth processing model for creating a language recognition vocabulary with the N second phoneme sequences per word obtained by the third processing module for the mother tongue language recognizer.

Under a preferred embodiment, the automatic language recognizer has a fifth processing module for processing the N second phoneme sequences corresponding to the N second pronunciation variant of each word. The fifth processing module is designed in such a way that each second phoneme sequence is analyzed and classified using suitable distances, particularly the Levenshtein distance and the N second phoneme sequences of each word are reduced to a few, preferably two to three, phoneme sequences.

Furthermore, the automatic language recognizer can have a language identifier and a language reducer. The language identifier is connected before the first processing module and, for each word to be recognized, it determines the probability of it belonging to each of the N different languages. The language reducer reduces the number of languages to be processed by the first processing module, preferably down to two to three different languages, so that the languages with the least probability are not further processed. The language identifier and language reducer substantially reduce both the processing effort of the automatic language recognizer, both in the input phase and in the recognition phase.

Preferably, the first processing module has at least one neural network for determining the phonetic transcripts.

Furthermore, the mother tongue language recognizer has, in a preferred form of embodiment, a Hidden Markov model that has been created for the language defined as the mother tongue.

Turning to FIG. 1, a speaker-related name is selected on a mobile telephone using the names from a telephone book, for a German-speaking user. In the telephone book, there are in addition to the mainly German-language names, also some foreign-language names. A transcriber for the graphemic representation of the names is set for the German, Italian, Czech, Greek and Turkish languages, overall as N=5 different languages.

In an initial step S0 of FIG. 1, a language identification of the supplied words 10 or entries in the telephone book is undertaken. More precisely, each individual word is analyzed with regard to the probability of it belonging to one of the five languages. If, for example, a German name is being processed, the probability for German is very high. For the other four languages, i.e. Italian, Czech, Greek and Turkish, the probability is much lower. Using the probabilities determined per word, the language with the lowest probability is omitted during subsequent processing. As an example, this means that in the succeeding processing operation there are then only four, instead of five, languages that have to be processed.

In a first step S1 of FIG. 1, the phonetic transcript for each word is determined for each of the four different languages. In this way, four phoneme sequences corresponding to the four first pronunciation variants are obtained for each word.

In a second step S2 of FIG. 1, a mapping of the phonemes of each of the four languages is implemented to the particular phoneme set of the mother tongue.

In a third step S3 of FIG. 1, this mapping is applied to the four first phoneme sequences 12 obtained in the first step S1. In this way, four second phoneme sequences 14 corresponding to the four second pronunciation variants are obtained for each word. The four second phoneme sequences 14 can already be recognized in a mother tongue language recognizer.

Furthermore to further reduce the processing effort for the language recognizer, each second phoneme sequence is analyzed and classified for each word using the Levenshtein distance (step S4). A fifth step S5 then takes place, in which the analyzed and classified second phoneme sequences per word are reduced to three phoneme sequences.

Finally, in a last step S6, a language recognition vocabulary is created for the mother tongue language recognizer with the three second phoneme sequences per word obtained in the fifth step S5. By still further reducing the phoneme sequences in the fifth step of the method S5, the language recognition vocabulary to be saved and to be analyzed during a language recognition process is substantially reduced. In a practical application of the language recognizer, this has an advantage of having a lower storage capacity requirement and also of a faster processing, because the vocabulary to be searched through is smaller.

After the described procedure has been completed, the user can, by means of language recognition, make a name selection, i.e. make a language-controlled call up of stored telephone numbers using the name of the subscriber, without having to explicitly pronounce the name of the subscriber to be called, i.e. without having to "train".

Furthermore, if a user finds that a certain name is not well recognized, the user can call up the language recognition menu of his mobile telephone and then select a "name selection" application. By means of this application, the user can now be offered one, or several ways of improving the language recognition of a certain word, or more precisely of a certain name, from the electronic telephone book of the mobile telephone. Some of these possibilities are briefly explained in the following by way of example.

1. As an alternate embodiment, the user can again speak the poorly recognized or unrecognized word into the mobile telephone and then have it converted into a phoneme sequence by means of the language recognizer contained in the mobile telephone. In this case, pronunciation variants previously automatically determined are either completely or partially removed from the vocabulary of the language recognizer, depending on their closeness to the newly determined phoneme sequence.

2. As yet another alternate embodiment, the user can have a kind of phonetic transcription of the poorly recognized or unrecognized entry in the electronic telephone book shown on the display of the mobile telephone. As an example, if there is a poor match to the user's pronunciation, the user can edit the kind of phonetic transcription. For example, by an automatic transcription of the entry "Jacques Chirac", "Jakwes Shirak" can be stored as a phonetic transcription. If this phonetic transcription now appears incorrect to the user, he can edit it using his mobile telephone, for example to "Zhak Shirak". The system can then also determine the phonetic description and reenter this in the language recognition vocabulary. This should enable the automatic language recognition to function reliably.

3. Also, the user can, by an explicit specification of a language from which a faulty or even unrecognized name originates substantially improve the recognition by an explicit selection of a specific language for a specific name. In such a case, all the pronunciation variants of the name, that are not assigned to the explicitly specified language, are removed from the language recognition vocabulary.

In addition, although the invention is described in connection with mobile telephones, it should be readily apparent that the invention may be practiced with any type of communicating device, such as a personal assistant or a PC. It is also understood that the device portions and segments described in the embodiments above can substituted with equivalent devices to perform the disclosed methods.

The invention claimed is:

1. A method for automated language recognition of words from different languages said method embodied as computer program instructions encoded in tangible, non-transitory computer readable media associated with a mobile device and comprising the steps of:
 (a) loading a phoneme set associated with a language specified as a mother tongue into a mother tongue language recognizer;
 (b) for each of a plurality of words, determining phonetic transcripts for the word for N various languages not specified as the mother tongue to generate N first phoneme sequences for the word corresponding to N first pronunciation variants, each of the N first phoneme sequences formed from phonemes associated with one of the N different languages;

(c) determining a phoneme map by mapping the generated first phoneme sequences of each of said N languages to a relevant phoneme set of the mother tongue;

(d) for each of the plurality of words, applying the phoneme map to each of the N first phoneme sequences for that word in order to translate the N first phoneme sequences into N second phoneme sequences, each of the N second phoneme sequences formed from phonemes associated with the mother tongue language, wherein each of the N first phoneme sequences of the N various language is translated into a corresponding second phoneme sequence of the mother tongue language (a) regardless of whether the mobile device includes a speech model for each of the N various languages, and (b) regardless of whether the mother tongue language is the most acoustically similar to each of the N various languages, with respect to the respective first and second phoneme sequences, and such that for each word, two different phonetic transcripts are generated for each of the N different languages, including (1) the N first phoneme sequences for the word, each formed from phonemes associated with one of the N different languages, and (2) the N second phoneme sequences for the word, each formed by applying the phoneme map to translate one of the N first phoneme sequences formed from phonemes associated with one of the N different languages into a sequence of phonemes associated with the mother tongue language; and (e) processing said N second phoneme sequences with the phoneme set associated with the language specified as the mother tongue to identify at least one of a matching word and a similar word.

2. The method according to claim 1, further comprising a step of adding the N second phoneme sequences for each word in a language recognition vocabulary located in the mother tongue language recognizer.

3. The method according to claim 1, further determining distances to the N second pronunciation variants based at least on the processed N second phoneme sequences.

4. The method according to claim 3, further comprising a step of classifying each N second phoneme sequences to identify respective distances.

5. The method according to claim 4, further comprising a step of eliminating any N second phoneme sequences that do not exceed a predetermined threshold.

6. The method according to claim 5, wherein the distances are Leveshtein distances.

7. The method according to claim 1, further comprising the step of determining probabilities that each word for N various languages not specified as the mother tongue belong to a specified set of languages, said step of determining probabilities occurring before step (a).

8. The method according to claim 7, further comprising the step of eliminating languages from said specified set that do not exceed a predetermined threshold.

9. The method according to claim 1, wherein the step of determining the phonetic transcripts of each word for N various languages not specified as the mother tongue is performed by at least one neural network.

10. The method according to claim 1, wherein processing said N second phoneme sequences with the phoneme set associated with the language specified as a mother tongue is performed using a Hidden Markov Model.

11. An automatic language recognizing apparatus, including computer program modules encoded in tangible, non-transitory computer readable media associated with a mobile device, the computer program modules comprising:

a mother tongue language recognizer, said recognizer storing a phoneme set of a predetermined mother tongue;

a first processing module for determining phonetic transcripts for each word of a plurality of words from N various languages in order to obtain N first phoneme sequences for each word corresponding to N first pronunciation variants, each of the N first phoneme sequences formed from phonemes associated with one of the N different languages;

a second processing module for implementing a mapping of first phoneme sequence of each of N various languages to a particular phoneme set of the mother tongue;

a third processing module for applying the implemented mapping of phonemes to translate the N first phoneme sequences for each word determined by means of the first processing module into N second phoneme sequences corresponding to N second pronunciation variants being obtained for each word, the N second phoneme sequences formed from phonemes associated with the mother tongue language and being recognized by the mother tongue language recognizer;

wherein the third processing module translates each of the N first phoneme sequences of the N various language into a corresponding second phoneme sequence of the mother tongue language (a) regardless of whether the mobile device includes a speech model for each of the N various languages, and (b) regardless of whether the mother tongue language is the most acoustically similar to each of the N various languages, with respect to the respective first and second phoneme sequences, and such that for each word, two different phonetic transcripts are generated for each of the N different languages, including (1) the N first phoneme sequences for the word, each formed from phonemes associated with one of the N different languages, and (2) the N second phoneme sequences for the word, each formed by applying the phoneme map to translate one of the N first phoneme sequences formed from phonemes associated with one of the N different languages into a sequence of phonemes associated with the mother tongue language; and a fourth processing module for creating a language recognizable vocabulary with the N second phoneme sequences for each word, obtained by the third processing module, for the mother tongue language recognizer.

12. The automatic language recognizing apparatus according to claim 11, further comprising a fifth processing module for processing the N second phoneme sequences corresponding to the N second pronunciation variants of each word to obtain distances for each N second phoneme sequence.

13. The automatic language recognizing apparatus according to claim 12, wherein said distances are Levenshtein distances.

14. The automatic language recognizing apparatus according to claim 13, wherein the N second phoneme sequence distances not exceeding a predetermined threshold are eliminated from further processing.

15. The automatic language recognizing apparatus according to claim 11, further comprising a language identifier, coupled to the first processing module, wherein the language identifier determines a probability of each word belonging to each of the N various languages.

16. The automatic language recognizing apparatus according to claim 15, further comprising a language reducer that reduces the number of languages from the first processing module to be processed if said probability does not exceed a predetermined thresholds.

17. The automatic language recognizing apparatus according to claim 11, wherein the first processing module comprises at least one neural network for determining the phonetic transcripts.

18. The automatic language recognizing apparatus according to claim 11, wherein the mother tongue language recognizer comprises a Hidden Markov model that has been created for the phoneme set of the predetermined mother tongue.

* * * * *